(12) United States Patent
Iannicelli et al.

(10) Patent No.: US 7,601,319 B2
(45) Date of Patent: Oct. 13, 2009

(54) PROCESS FOR THE MANUFACTURE OF MONOBASIC POTASSIUM PHOSPHATE

(75) Inventors: Joseph Iannicelli, Brunswick, GA (US); Joseph Pechtin, Brunswick, GA (US)

(73) Assignee: J.I. Enterprises, Inc., Brunswick, GA (US)

( * ) Notice: Subject to any disclaimer, the term of this patent is extended or adjusted under 35 U.S.C. 154(b) by 53 days.

(21) Appl. No.: 11/859,071

(22) Filed: Sep. 21, 2007

(65) Prior Publication Data
US 2009/0081103 A1    Mar. 26, 2009

(51) Int. Cl.
*C01B 25/30* (2006.01)
(52) U.S. Cl. ..................................... 423/309
(58) Field of Classification Search ............... 423/313, 423/309; 71/34, 41, 64.03, 64.13
See application file for complete search history.

(56) References Cited

U.S. PATENT DOCUMENTS 4,351,735 A * 9/1982 Buddemeyer et al. .......... 252/1
4,836,995 A    6/1989 Manor et al.

OTHER PUBLICATIONS

Smirnova et al., "Study of the Process of Synthesis of Monosubstituted Potassium Phosphate," 1983, Monokristallicheskiye Materialy, 11, pp. 94-98.*

* cited by examiner

*Primary Examiner*—Wayne Langel
*Assistant Examiner*—Brittany M Martinez
(74) *Attorney, Agent, or Firm*—Banner & Witcoff, Ltd.

(57) ABSTRACT

A process for producing monobasic potassium phosphate is provided wherein a reaction mixture of phosphoric acid is combined with potassium hydroxide. The resulting product is cooled to allow crystallization of the product. The product is homogenized and spray dried, resulting in a pure free flowing powder of monobasic potassium phosphate (MKP).

13 Claims, 1 Drawing Sheet

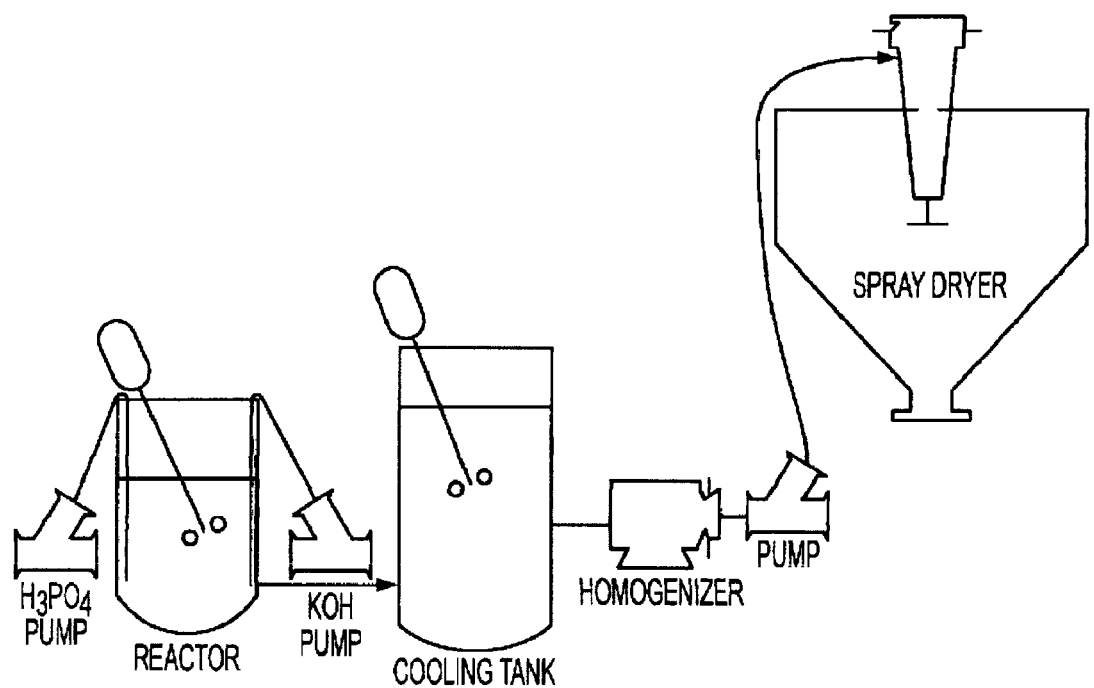

PROCESS FOR THE MANUFACTURE OF MONOBASIC POTASSIUM PHOSPHATE

DESCRIPTION OF RELATED ART

Monobasic potassium phosphate, also called monopotassium dihydrogen phosphate (MKP), is a soluble salt commonly used in pesticides, food additives, and fertilizers. Methods for the economical production of MKP are highly desirable.

Several attempts have been made to efficiently and economically produce MKP. One proposed process involved introducing phosphoric acid, potassium hydroxide and water into a plug flow reactor. The mixture was then dried, passed through screens and then pulverized. The pulverized reaction product was then cooled and stored.

In 1989 Haifa Chemicals, Ltd. was issued U.S. Pat. No. 4,836,995, which disclosed an alternative process for the manufacture of MKP using a reaction between phosphoric acid and potassium chloride in the presence of an organic solvent containing a long chain primary amine which reacts with the hydrochloric acid generated as a byproduct. The monopotassium phosphate and dipotassium phosphate produced are acidulated by a solution of phosphoric acid whereby the monopotassium salt is obtained and separated. The amine reagent is regenerated with calcium oxide or calcium carbonate. Neither of these processes provides an economical synthesis of MKP.

The reaction between phosphoric acid and potassium hydroxide is a highly exothermic reaction. The reaction produces a hot (>60° C.) reaction slurry of MKP. There have been numerous attempts to produce MKP via spray drying. One of the difficulties encountered is that spray drying such a solution results in the precipitation of crystals when the reaction mixture is transferred to an atomizer or a spray device within the spray dryer. Heat tracing of the reaction mixtures is also problematic. The hot saturated reaction mixture is prone to pre-drying during expansion from the spray orifice, resulting in clogging or plugging. Previous attempts to overcome these problems involved dilution of the reaction mixture. This, however, increases the drying cost because of the sharply increased ratio of water to dry product. For example, only 0.43 lbs. water is dried to produce 1 lb. $KH_2PO_4$ from a 70% slurry, but 1.22 lbs. water must be dried to produce 1 lb. $KH_2PO_4$ from a 45% saturated solution (90° C.). In summary, by decreasing solids 25% (70% to 45%), the ratio of water evaporated to dried $KH_2PO_4$ is increased by 284%.

It would be advantageous to develop an economical process of preparing MKP via a spray drying method.

SUMMARY

In one aspect, monobasic potassium phosphate can be prepared by combining potassium hydroxide and phosphoric acid to form a reaction mixture. The reaction mixture is cooled to precipitate crystals of monobasic potassium phosphate. The reaction mixture is then homogenized and spray dried. Solid monobasic potassium phosphate may be recovered.

BRIEF DESCRIPTION OF THE DRAWINGS

The FIGURE shows a schematic representation of a process for producing MKP.

DETAILED DESCRIPTION OF THE INVENTION

Monobasic potassium phosphate may be prepared according to the general reaction illustrated by the equation $KOH + H_3PO_4 \rightarrow KH_2PO_4 + H_2O$.

With reference to the FIGURE, a simplified direct process for manufacturing MKP may overcome the difficulties associated with spray drying the MKP reaction product.

Unless indicated otherwise, all percentages referred to herein are on a weight (w/w) basis.

The reagents involved in the production of monobasic potassium phosphate are phosphoric acid and potassium hydroxide. Concentrated phosphoric acid is commonly 85% phosphoric acid in aqueous solution, however, other percentages may be used. Concentrations between about 70 and 85% (weight/volume or weight/weight) may be used. Concentrated potassium hydroxide may be used at concentrations of about 40-50%. Both reagents may be combined into a reaction vessel. The reagents may be pumped into the reaction vessel or manually added. Pumping of each reagent may occur at a variety of rates. Depending on the size of the reaction tank, the reagents may be pumped into the reaction tank at 1, 2, 5, 10 or more gallons per minutes (gpm). Water may be added to dilute the reaction mixture and to maintain a slurry. Once both reagents are added, the reaction mixture usually is mixed for a period of time, usually about 10, 20, 30, 60, 120, or more minutes. Mixing can occur by a variety of mechanisms. One common method of mixing is to use agitators present within the reaction vessel. The agitators may operate at a variety of speeds to obtain the most efficient mixing.

After the reaction has been mixed it may be transferred to a storage tank where it may be combined with additional MKP reaction mixtures from separate reactions and allowed to cool to allow MKP to crystallize. Usually, the reaction mixture is cooled to about 60° C. or lower, often about 55° C. or 50° C. or lower. The reaction mixture may be cooled by any means of refrigeration commonly used for chemical mixtures or the reaction may be allowed to cool without the assistance of any means of refrigeration.

Once the reaction mixture has been cooled it then may be homogenized. This reduces the particle size within the cooled reaction mixture/slurry. Any suitable equipment may be used, such as an IMPEX High Shear Mill homogenizer set at about a 25 micron clearance between the rotor and stator. The reaction mixture may be pumped into the homogenizer, for example, at a rate of about 5 gpm and collected in a storage container such as a stainless steel drum. Any means of pumping may be employed. For example, a peristaltic pump may be used to move the cooled reaction mixture to the homogenizer.

After the reaction mixture is homogenized, an additional peristaltic pump may be used to move the homogenized slurry to a spray dryer. Spray drying involves the atomization of a liquid into a spray followed by the drying of droplets in a drying chamber. When the moisture evaporates from droplets, dry particles are formed and these particles are released from a drying chamber for collection. Spray dryers usually have a feed pump, an atomizer, an air heater, an air disperser, a drying chamber and systems for exhaust air cleaning and powder recovery. One example of a spray dryer that may be used is a 16 ft. diameter Niro spray dryer. However, other types of spray dryers may be used. The mixture/slurry may be passed directly to the atomizer at an appropriate rate. The inlet temperature may be set to a temperature between about 300° C. and 550° C. and the outlet temperature may be set to a temperature between about 90° C. and 105° C. Often, the outlet temperature is between about 90° C. and 100° C. and the inlet temperature is between about 350° C. and 400° C.

Many factors are involved in determining particle size such as the degree of atomization, the concentration of the solution, and the degree of homogenization. Any one or more of these factors may be manipulated to alter particle size. The resulting product is generally a free flowing powder of MKP that is typically in the particle size range of about 75-100 microns. However, it should be understood that the particle size may deviate from this exemplified range.

EXAMPLE 1

This example is diagramed in the FIGURE. 100 gallons of water were added into a 550 gallon stainless steel tank equipped with a Cowles Dissolver agitator. Concentrated phosphoric acid (~85%) was pumped into the tank via a peristaltic pump at 2 gallons per minute for 5 minutes. Potassium hydroxide was then pumped into the tank at a rate of 2 gallons per minute. The inlet pipes for each reagent were installed 180° apart in the tank. After all of the reagents were combined, the reaction mixture was mixed for 30 minutes. The hot reaction mixture was then transferred to a 1500 gallon storage tank where it was combined with additional batches of MKP reaction mixtures and allowed to cool to 55° C.

The stabilized partially crystallized reaction mixture was then pumped through a homogenizer (IMPEX High Shear Mill) at a rate of 5 gallons per minute and collected in a stainless steel 55 gallon drum. The homogenizer was set at 25 micron clearance between rotor and stator.

A second peristaltic pump then moved the homogenized slurry to the atomizer of a 16 ft. diameter Niro spray dryer. The outlet temperature was 95° C. and the inlet temperature was 370° C.

The resulting free flowing product was analyzed to be 52.18% $P_2O_5$ and 34.63% $K_2O$ which compared favorably with reagent grade MKP that analyzed 52.23% $P_2O_5$ and 34.65% $K_2O$. Moisture content was 0.27%. A 10% solution pH of product was 4.22 compared to 4.26 for reagent grade MKP.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A process of preparing monobasic potassium phosphate comprising:
   (i) combining potassium hydroxide and phosphoric acid to form a reaction mixture,
   (ii) cooling the reaction mixture to precipitate crystals of monobasic potassium phosphate,
   (iii) homogenizing the reaction mixture,
   (iv) spray drying the reaction mixture, and
   (v) recovering solid monobasic potassium phosphate.

2. The process of claim 1 wherein the solid monobasic potassium phosphate is a powder having a particle size of about 75-100 μm.

3. The process of claim 1 wherein the phosphoric acid has a concentration of about 75-85%.

4. The process of claim 1 wherein the potassium hydroxide has a concentration of about 40-50%.

5. The process of claim 1 wherein the spray drying occurs at an inlet temperature between about 300°-550° C.

6. The process of claim 1 wherein the spray drying occurs at an inlet temperature of about 350° C.-400° C.

7. The process of claim 1 wherein the spray drying occurs at an outlet temperature between about 90°-105° C.

8. The process of claim 1 wherein the reaction mixture is cooled to a temperature below 60° C.

9. The process of claim 1 wherein the reaction mixture is cooled to a temperature of about 50° C.-60° C.

10. The process of claim 1 wherein the homogenizing is carried out with a homogenizer set at about 25 micron clearance between the rotor and stator.

11. The process of claim 10 wherein a peristaltic pump moves the reaction mixture from the homogenizer to a spray dryer.

12. The process of claim 10 wherein a peristaltic pump moves the reaction mixture into the homogenizer.

13. A process of preparing monobasic potassium phosphate by spray drying a reaction mixture of potassium hydroxide and phosphoric acid, the process comprising:
   (i) cooling the reaction mixture to a temperature below about 60° C.,
   (ii) homogenizing the reaction mixture,
   (iii) spray drying the reaction mixture, and
   (iv) recovering solid monobasic potassium phosphate.

* * * * *

UNITED STATES PATENT AND TRADEMARK OFFICE
CERTIFICATE OF CORRECTION

PATENT NO. : 7,601,319 B2 Page 1 of 1
APPLICATION NO. : 11/859071
DATED : October 13, 2009
INVENTOR(S) : Joseph Iannicelli and Joseph Pechin It is certified that error appears in the above-identified patent and that said Letters Patent is hereby corrected as shown below:

On the Cover Page, item 75: inventor:
delete "Pechtin" and insert --Pechin--

Signed and Sealed this

Tenth Day of November, 2009

David J. Kappos
*Director of the United States Patent and Trademark Office*